J. M. STONE.
Hydraulic Hose.

No. 164,946. Patented June 29, 1875.

Witnesses,
N. C. Lombard
Wm. C. Hibbard

Inventor,
Joseph M. Stone

UNITED STATES PATENT OFFICE.

JOSEPH M. STONE, OF NORTH ANDOVER, MASSACHUSETTS.

IMPROVEMENT IN HYDRAULIC HOSE.

Specification forming part of Letters Patent No. 164,946, dated June 29, 1875; application filed March 18, 1875.

*To all whom it may concern:*

Be it known that I, JOSEPH M. STONE, of North Andover, in the county of Essex and State of Massachusetts, have invented an Improvement in Hose, of which the following is a specification:

My improvement relates to the manner of making india-rubber hose, or hose made of canvas coated and united by a suitable cement.

The method of making this hose, which I have practiced with success, consists, first, in winding a long piece of canvas of the proper length for a length of hose, and wound with india-rubber in a suitable condition to be vulcanized, around a long rod or mandrel of the proper size for the bore of the hose with as many convolutions as will give it the proper strength or thickness. I then cover this with a narrow strip of canvas also coated with rubber in the proper condition for vulcanizing, which is wound around and upon the first-mentioned part in a helical direction, with the edges of the convolutions meeting, as is shown in the lower part of the drawings, or slightly lapped, as is shown in the upper part. This strip may be made of any convenient width.

By this means the several parts are perfectly confined together, and have no free joints exposed that might become loose; and for this reason I prefer to make the helical strip in the woven form, like tape. After the parts are put together and varnished with rubber varnish, the whole is subjected to the vulcanizing process in the usual way, which completes it.

Figure 1:
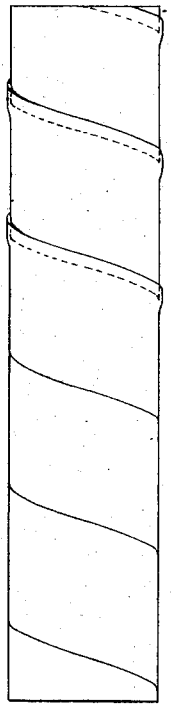
Figure 3:
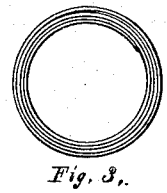
Figure 2:
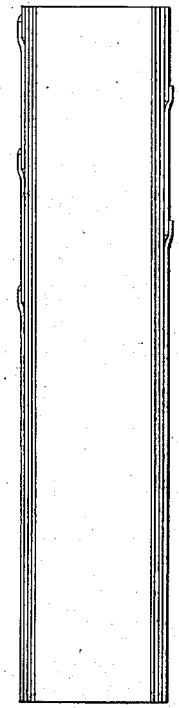

In the drawing, Figure 1 is an elevation of the outside of the hose. Fig. 2 is a section through the center, and Fig. 3 is a transverse section.

What I claim is—

1. The process of making hose by first forming a tube of canvas covered with india-rubber prepared for vulcanizing in the usual way, and then winding upon the outside thereof a helical strip of canvas also prepared for vulcanizing, the parts being united by cement, and the whole then vulcanized in the usual way.

2. The hose described, consisting of the convolute foundation and the helical exterior cover, the whole being vulcanized, substantially as described.

Executed March 16, 1875.

JOSEPH M. STONE.

Witnesses:
  N. C. LOMBARD,
  WM. C. HIBBARD.